United States Patent
Sano

(10) Patent No.: US 7,669,998 B2
(45) Date of Patent: Mar. 2, 2010

(54) INK SET CONTAINING AT LEAST THREE BLACK INK COMPOSITIONS

(75) Inventor: Tsuyoshi Sano, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 516 days.

(21) Appl. No.: 11/589,679

(22) Filed: Oct. 30, 2006

(65) Prior Publication Data

US 2007/0109377 A1     May 17, 2007

(30) Foreign Application Priority Data

Oct. 31, 2005   (JP)  .......................... P.2005-315772

(51) Int. Cl.
    *G01D 11/00*     (2006.01)
(52) U.S. Cl. .......................... 347/100; 347/95; 347/101
(58) Field of Classification Search ................. 347/100, 347/95, 96, 101; 106/31.6, 31.27, 31.13; 523/160
See application file for complete search history.

(56) References Cited

U.S. PATENT DOCUMENTS

| | | | | |
|---|---|---|---|---|
| 6,234,606 | B1 * | 5/2001 | Suzuki | 347/100 |
| 6,533,409 | B2 * | 3/2003 | Koitabashi | 347/96 |
| 2004/0035320 | A1 * | 2/2004 | Sano et al. | 347/100 |
| 2005/0007416 | A1 * | 1/2005 | Takekoshi et al. | 347/41 |

FOREIGN PATENT DOCUMENTS

JP     11-320924     11/1999

OTHER PUBLICATIONS

Computer-Generated English Translation of Specification and Clams and Patent Abstracts of Japan of 11-320924 dated Nov. 24, 1999.

* cited by examiner

*Primary Examiner*—Manish S Shah
(74) *Attorney, Agent, or Firm*—Ladas and Parry LLP

(57) ABSTRACT

An ink set including at least three black ink compositions different in concentration, wherein the colorant of the black ink composition having the highest concentration is a pigment, the colorant of the black ink composition having the lowest concentration is a dye, and the colorant(s) of the black ink composition(s) for medium gradation having medium concentration between them is a pigment or dye.

7 Claims, No Drawings

INK SET CONTAINING AT LEAST THREE BLACK INK COMPOSITIONS

FIELD OF THE INVENTION

The present invention relates to an ink set containing at least three black ink compositions, a recording method using the above ink set, and recorded matter obtained by the above method. The ink set of the invention possesses sufficient gloss and short-term color stability and also possesses excellent ejection stability, though it has a simple and inexpensive constitution.

BACKGROUND OF THE INVENTION

For the purpose of obtaining good black-and-white monochrome images and gray scale by an inkjet recording method or the like, there are sometimes used an ink set containing at least three black inks different in concentration of a black pigment (i.e., carbon black). For example, by using three black inks different in carbon black concentration, stability of gray balance and metamerism are dramatically improved. Particularly, the effect is very large in terms of gray balance. Namely, this is because graininess in a high-tone region (bright region) is overcome, which is problematic in the case that gray balance is outputted with only one or two black inks.

An image recording apparatus using plurality of black ink compositions different in carbon black concentration and a set of color ink compositions in combination and a controlling method thereof have been already known (Patent Document 1). However, the technology described in Patent Document 1 aims at formation of monochrome high gradation images in addition to color images on the same recording medium, and it merely disclose the use of plurality of black ink compositions in order to form the monochrome high gradation images.

Moreover, an ink set containing three or more black inks different in black dye concentration have been hitherto known and also offered commercially.

Patent Document 1: JP-A-11-320924

In the case that the colorants of the three black inks are all black dyes, there is a problem in respect of short-term color stability. Namely, since a phenomenon of gradual color change after output from a printer onto a recording paper is induced, the quality is insufficient for monochrome print where strict color accuracy is required.

On the other hand, in the case that the colorants of the three black inks are all black pigment (i.e., carbon black), print quality is high and particularly there is no problem in short-term color stability but there are problems in respect of increased complexity of composition and in respect of gloss. Namely, in the case that recording is carried out using a black ink composition low in carbon black concentration, in recorded images, at the time when a fluorescent lamp, an outside light, or the like is reflected by recorded images, there is a problem that the reflected light generates gold-like gloss. Moreover, in the case that recording is carried out using a black ink composition for medium gradation having medium concentration, there is a problem that there is generated a part where gray lightness shifts.

SUMMARY OF THE INVENTION

As a result of extensive studies on a technology for solving these problems, the present inventors have found that an ink set having sufficient physical properties in terms of short-term color stability and in terms of gloss and also excellent in printer reliability can be provided by using a pigment as the colorant of the black ink composition having the highest concentration, using a dye as the colorant of the black ink composition having the lowest concentration, and using a pigment or dye as the colorant(s) of black ink composition(s) for medium gradation having medium concentration between them, without using an additive such as a resin component.

The invention is based on such findings.

Accordingly, the invention relates to an ink set comprising at least three black ink compositions different in concentration, wherein the colorant of the black ink composition having the highest concentration is a pigment, the colorant of the black ink composition having the lowest concentration is a dye, and the colorant(s) of black ink composition(s) for medium gradation having medium concentration between them is a pigment or dye.

According to a preferred embodiment of the ink set of the invention, the pigment content in the black ink composition having the highest concentration is from 1.5 to 10% by weight based on the total weight of the black ink composition having the highest concentration.

According to another preferred embodiment of the ink set of the invention, the dye content in the black ink composition having the lowest concentration is less than 0.4% by weight based on the total weight of the black ink composition having the lowest concentration.

According to still another preferred embodiment of the ink set of the invention, the content of the pigment or dye in the black ink composition for medium gradation is from 0.4 to less than 1.5% by weight based on the total weight of the black ink composition for medium gradation.

According to further another preferred embodiment of the ink set of the invention, it further comprises a color ink composition.

According to still another preferred embodiment of the ink set of the invention, it is an aqueous one.

According to further another preferred embodiment of the ink set of the invention, it is used for inkjet recording.

Moreover, the invention also provides a recording method using the above ink set, and recorded matter recorded by the recording method.

The ink set of the invention has sufficient physical properties in terms of short-term color stability and in terms of gloss and is also excellent in printer reliability, although it has a simple and inexpensive constitution.

DETAILED DESCRIPTION OF THE INVENTION

The ink set of the invention may comprise a black ink-constituting part alone (i.e., a monochrome ink set) or comprise a black ink-constituting part and a color ink-constituting part (e.g., color printing inks). In the ink set of the invention, the black ink-constituting part contains at least three black ink compositions different in concentration. However, the black ink-constituting part of the ink set of the invention preferably comprises three or four black ink compositions different in concentration.

In the case that the above black ink-constituting part comprises three or four black ink compositions different in concentration, the part may comprise a black ink composition having the highest concentration, one or two black ink compositions for medium gradation, and a black ink composition having the lowest concentration.

The pigment content in the black ink composition having the highest concentration is preferably from 1.5 to 10% by weight, more preferably from 1.5 to 8% by weight based on the total weight of the composition. Moreover, the dye content in the black ink composition having the lowest concentration is preferably less than 0.4% by weight, more preferably from 0.01% to less than 0.4% by weight, still more preferably from 0.05 to 0.3% by weight, most preferably from 0.1 to 0.25% by weight based on the total weight of the composition.

The content of the pigment or dye in the black ink composition for medium gradation is preferably from 0.4 to 1.5% by weight, more preferably from 0.5 to 1.2% by weight, particularly from 0.6 to 1.0% by weight. The black ink composition for medium gradation incorporated into the ink set of the invention may be one or two or more compositions. In the case of using two or more black ink compositions for medium gradation, the content of the pigment or dye in each ink composition thereof preferably falls within the above range.

As carbon black for use in the black ink composition incorporated into the ink set of the invention, in addition to titanium oxide and iron oxide, carbon black produced by a known method such as a contact method, a furnace method, or a thermal method can be used. As the carbon black, there may be employed No. 2300, No. 900, HCF88, No. 33, No. 40, No. 45, No. 52, MA7, MA8, MA100, No2200B, and the like manufactured by Mitsubishi Chemical Corporation; Raven 5750, Raven 5250, Raven 5000, Raven 3500, Raven 1255, Raven 700, and the like manufactured by Columbia; Regal 1400R, Regal 1330R, Regal 1660R, Mogul L, Monarch 700, Monarch 800, Monarch 880, Monarch 900, Monarch 1000, Monarch 1100, Monarch 1300, Monarch 1400, and the like manufactured by Cabot; Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, Special Black 4, and the like manufactured by Degussa but the carbon black is not limited thereto.

Moreover, in the invention, carbon black whose surface is subjected to oxidation treatment may be used. In this case, it is not necessary to use a dispersant. The oxidation treatment can be carried out by a known method. By the oxidation treatment, a hydrophilic group such as a carbonyl group, a carboxyl group, a hydroxyl group, or a sulfone group can be introduced onto the surface of the above carbon black.

The particle size of the carbon black is not particularly limited but is preferably 10 μm or less, more preferably 0.1 μm or less.

Moreover, in the ink set of the invention, the carbon black incorporated in each black ink composition may be the same or different from one another.

In the carbon black ink composition in the ink set of the invention, the carbon black is preferably added to the ink composition as a pigment dispersion wherein the carbon black is dispersed into an aqueous medium by the aid of a dispersant, for example. As the dispersant to be used for preparing the pigment dispersion, there may be employed a dispersant generally used for preparing a pigment dispersion, e.g., a polymer dispersant or a surfactant.

The amount of the dispersant to be incorporated into the carbon black ink composition in the ink set of the invention is not particularly limited but is preferably in the range of from 0.01 to 10% by weight, more preferably from 0.1 to 5% by weight. When the content of the dispersant is less than 0.01% by weight, a surface active effect cannot be sufficiently obtained. When the content is larger than 10% by weight, there is observed a case where defective ejection is induced owing to precipitation of crystals, formation of crystals, or decreased stability of the pigment.

As the dispersant, there may be suitably used a dispersant conventionally used for preparing a pigment dispersion, for example a polymer dispersion, in addition to a conventional surfactant. Incidentally, it is apparent for one skilled in the art that the dispersant incorporated in the pigment dispersion may also function as a dispersant and a surfactant for the black ink composition.

The carbon black ink composition in the ink set of the invention may contain a surfactant. Specific examples of the surfactant include anionic surfactants (e.g., sodium dodecylbenzenesulfonate), nonionic surfactants (e.g., polyoxyethylene alkyl ether), amphoteric surfactants (e.g., N,N-dimethyl-N-alkyl-N-carboxymethylammonium betain), and the like. They may be used singly or as a combination of two or more thereof.

The carbon black ink composition in the ink set of the invention preferably contains an acetylene glycol-based surfactant and/or a silicone-based surfactant. By the addition thereof, permeability of the black ink composition into a recording medium can be improved and recording showing less blurring can be expected on various recording media. Furthermore, the carbon black ink composition in the ink set of the invention may contain a water-soluble organic solvent as a wetting agent, a drying-speed regulator, and/or a stabilizer.

It is not necessary for the carbon black ink composition in the ink set of the invention to contain a resin component in an amount exceeding a substantial amount. In this connection, the substantial amount of the resin component means an amount necessary for obtaining a good glossy function by the resin component and, for example, is an amount of 4% by weight or more based on the total weight of the carbon black ink composition. Therefore, it is preferable for the carbon black ink composition in the ink set of the invention to contain the resin component (solid matter) in an amount exceeding 4% by weight or more based on the total weight of the composition.

As the black dye for use in the black ink composition in the ink set of the invention, a dye hitherto usually employed as a black dye can be used. Specifically, there may be mentioned C.I. Acid Black 1, 2, 7, 24, 26, 29, 31, 48, 50, 51, 52, 58, 60, 62, 63, 64, 67, 72, 76, 77, 94, 107, 108, 109, 110, 112, 115, 118, 119, 121, 122, 131, 132, 139, 140, 155, 156, 157, 158, 159, 191, C.I. Direct Black 17, 19, 22, 32, 38, 51, 56, 62, 71, 74, 75, 77, 94, 105, 106, 107, 108, 112, 113, 117, 118, 132, 133, 146, 154, 164, 168, 195, C.I. Reactive Black 1, 3, 4, 5, 6, 8, 9, 10, 12, 13, 14, 18, 31, 35, C.I. Solubilized Pat Black 1, C.I. Sulfur Black 1, or C.I. Food Black 2, and the like.

Moreover, in the ink set of the invention, the black dye incorporated in each black ink composition may be the same or different from one another.

In the case that the ink set of the invention is an ink set for color recording, the kind and number of ink compositions constituting the ink set are not particularly limited so far as the above black ink compositions are incorporated as constituents of the ink set. Representative examples of the ink set of the invention may include six or seven-color ink set comprising a yellow ink composition, a cyan ink composition, a magenta ink composition, and three or four black ink compositions; eight or nine-color ink set comprising a light cyan ink composition and a light magenta ink composition in addition to the above six or seven-color ink set; nine or ten-color ink set comprising a dark yellow ink composition in addition to the above eight or nine-color ink set; nine or ten-color ink set comprising a red ink composition, a green ink composition, and a blue ink composition in addition to the above six or seven-color ink set; nine or ten-color ink set comprising an orange ink composition, a green ink composition, and a blue ink composition in addition to the above six or seven-color ink set; and nine or ten-color ink set comprising an orange ink composition, a green ink composition, and a violet ink composition in addition to the above six or seven-color ink set; and an ink set comprising still another black ink composition for medium gradation in addition to the above each ink set.

The ink set of the invention may have the same constitution as the conventionally known ink set except that the above black ink compositions are incorporated. Thus, the ink set of the invention may be utilized as an ink for various conventionally known recording methods. The ink set of the invention is preferably aqueous one, particularly an ink set for inkjet recording.

Moreover, the recording method of the invention is a recording method which comprises ejecting a droplet of an ink composition so that it is attached to the recording medium to effect printing, wherein the ink set of the invention is used. The recording method can be suitably accomplished by mounting an ink cartridge containing the ink set of the invention (an ink cartridge individually containing each black ink compositions) in a known inkjet recording apparatus and performing printing onto a recording medium.

The inkjet recording apparatus is preferably an inkjet recording apparatus comprising an electrostrictive element which can oscillate in accordance with electrical signal and arranged such that the oscillation of the electrostrictive element causes ejection of an ink constituting the ink set of the invention.

EXAMPLES

The present invention will be illustrated in greater detail with reference to the following Examples, but the invention should not be construed as being limited thereto.

Examples 1 and 2 and Comparative Examples 1 and 2

(1) Preparation of Carbon Black Ink Compositions

With regard to the three carbon black ink compositions described in the following Table 1, individual blend components were mixed, and then dispersed with glass beads [diameter=1.7 mm; amount: 1.5 times (by weight) that of the mixture) in a sand mill (manufactured by Yasukawa Seisakusyo Co., Ltd.) for 2 hours to obtain three carbon black ink compositions. Namely, one dark carbon black ink composition P1, one carbon black ink composition for medium gradation P2, and one light carbon black ink composition P3 were obtained.

(2) Preparation of Black Dye Ink Compositions

With regard to the three black dye ink compositions described in the following Table 1, individual blend components were mixed in a usual manner to obtain three carbon black ink compositions, i.e., one dark black dye ink composition D1, one black dye ink composition for medium gradation D2, and one light black dye ink composition D3.

In the following Table 1, Surfynol 465 is an acetylene glycol-based surfactant (Air Product). In Table 1, the unit is % by weight and the amount of pure water is an amount making the total of each ink composition 100% by weight.

TABLE 1

|  | P1 | P2 | P3 | D1 | D2 | D3 |
|---|---|---|---|---|---|---|
| Carbon black | 1.8 | 0.9 | 0.3 |  |  |  |
| Direct Black 164 |  |  |  | 1.8 | 1 | 0.3 |
| Styrene-acrylic acid copolymer ammonium salt water-soluble resin | 0.9 | 0.5 | 0.15 |  |  |  |
| Glycerin | 13 | 18 | 20 | 13 | 18 | 20 |
| Surfynol 465 | 1 | 1 | 1 | 1 | 1 | 1 |
| Triethanolamine | 0.5 | 0.5 | 0.5 | 0.5 | 0.5 | 0.5 |
| Pure water | remainder | remainder | remainder | remainder | remainder | remainder |

(3) Preparation of Ink Set

The three carbon black ink composition P1, P2, and P3 and the three black dye ink compositions D1, D2, and D3 were combined as shown below to prepare four ink sets.
Ink Set E1 (Example 1): "P1"+"P2"+"D3"
Ink Set E2 (Example 2): "P1"+"D2"+"D3"
Ink Set C1 (Comparative Example 1): "P1"+"P2"+"P3"
Ink Set C2 (Comparative Example 2): "D1"+"D2"+"D3"

Evaluation of Physical Properties (1) Recording Method

The four ink sets of the above Examples 1 and 2 and Comparative Examples 1 and 2 were packed in a special cartridge for an inkjet printer. Specifically, the dark black ink composition P1 or D1 was packed in a black ink chamber, the black ink composition for medium gradation P2 or D2 was packed in a cyan ink chamber, and the light black ink composition P3 or D3 was packed in a magenta ink chamber of a special cartridge for an ink-jet printer (MC-2000C; manufactured by SEIKO EPSON CORPORATION). As a printing paper, a special recording medium (photographic paper (glossy paper); manufactured by SEIKO EPSON CORPORATION) was used.

(2) Confirmation and Evaluation of Gloss [No. 1: Generation of Gold-Tinged Reflection]

A gray gradation pattern from white to black (gray scale) was outputted continuously from the above inkjet printer on the above special recording medium without dividing the gradation. The output was performed by distributing the amount of the individual ink compositions to be ejected.

Evaluation of gold-tinged reflection was carried out by five observers. The recorded matter outputted was placed on a desk 1.5 m just under a fluorescent lamp which was an interior light and the observers were allowed to stand by the side of the desk. The observers observed the printed matter from the right end to the left end thereof from various viewing angles with moving their gazes in an upright stance so as not to block off the light and judged whether generation of gold-tinged reflection was visually confirmed. The results of the observation are shown in the column of "Gloss (gold)" in the following Table 2. In this connection, on the recorded matter where gold-tinged reflection is generated, the light of the fluorescent lamp is strongly reflected as being gold-tinged at a black output color in the gray level range of around 140 when observed at a certain viewing angle. The meanings of Evaluations A to D shown in the column of "Gloss (gold)" in Table 2 are as follows.

A: Five observers visually confirmed no change in gloss.
B: One observer visually confirmed gold color change.
C: Three observers visually confirmed gold color change.
D: All the observers visually confirmed gold color change.

(3) Confirmation and Evaluation of Gloss [No. 2: Generation of White Strong Reflection]

A gray gradation pattern from white to black (gray scale) was outputted continuously from the above inkjet printer on the above special recording medium without dividing the gradation. The output was performed by distributing the amount of the individual ink compositions to be ejected.

Evaluation of white strong reflection was carried out by five observers. The recorded matter outputted was placed on a desk 1.5 m just under a fluorescent lamp which is an interior light and the observers were allowed to stand by the side of the desk. The observers observed the printed matter from the right end to the left end thereof from various viewing angles with moving their gazes in an upright stance so as not to block off the light and judged whether generation of white strong reflection was visually confirmed. The results of the observation are shown in the column of "Gloss (strong white reflection)" in the following Table 2. In this connection, on the recorded matter where strong white reflection is generated, at a black output color in the gray level range of 40 to 60, the light of the fluorescent lamp is strongly reflected whitely and the color looks reversed when observed at a certain viewing angle. The meanings of Evaluations A to D shown in the column of "Gloss (strong white reflection)" in Table 2 are as follows.

A: Five observers visually confirmed no change in gloss.
B: One observer visually confirmed change into white.
C: Three observers visually confirmed change into white.
D: All the observers visually confirmed change into white.

(4) Evaluation of Short-Term Color Stability

Patches having a gray scale pattern from white to black where the concentrations were fixed to ten stages were outputted from the above inkjet printer on the above special recording medium.

The ten patches were allowed to stand in a room immediately after outputted and change in measured color value with time was measured by a spectrophotometer (SPM-50; manufactured by GRETAG INC.) for 6 days at the maximum. Change in hue (ΔE) for 6 days of standing is shown in the column of "Short-Term Color Stability" in Table 2 as four-stage Evaluations A to D, the value immediately after outputted being a basis. The meanings of Evaluations A to D are as follows.

A: Change in hue (ΔE) was not larger than 1.5.
B: Change in hue (ΔE) was larger than 1.5 and not larger than 2.5.
C: Change in hue (ΔE) was larger than 2.5 and not larger than 4.
C: Change in hue (ΔE) was larger than 4.

(5) Evaluation of Ejection Stability

Using a gray scale pattern from white to black in the longitudinal direction over a whole sheet of A4 paper (90% region on the area basis), long-term print stability was evaluated. Printing was performed at 40° C. under a humidity of 20% for 8 hours per day. After printing, the power of the printer was turned off and it was allowed to stand. The operations were repeated continuously for 50 days (the printer was, however, allowed to stand in the power-off state on Saturday, Sunday, and holidays). In the printing operation for 50 days, head cleaning was performed at every time when dot missing and ejection deviation were generated and ejection stability was evaluated based on the number of cleaning times. The results are shown in the column of "Ejection Stability" in Table 2 as four-stage Evaluations A to D. The meanings of Evaluations A to D are as follows.

A: The number of cleaning times was not more than 10 times (not more than once per week).
B: The number of cleaning times was more than 10 times and not more than 20 times.
C: The number of cleaning times was more than 20 times and not more than 50 times.
D: The number of cleaning times was more than 50 times.

TABLE 2

|  | Example/Comparative Example | | | |
| --- | --- | --- | --- | --- |
|  | Example 1 | Example 2 | Comparative Example 1 | Comparative Example 2 |
| Ink set | E1 | E2 | C1 | C2 |
| Dark ink | P1 | P1 | P1 | D1 |
| Ink for medium gradation | P2 | D2 | P2 | D2 |
| Light ink | D3 | D3 | P3 | D3 |
| Gloss (gold) | A | A | D | A |
| Gloss (strong white reflection) | B | A | D | A |
| Short-term color stability | A | B | A | D |
| Ejection reliability | A | A | B | A |

The ink set of the invention possesses sufficient gloss and short-term color stability and also possesses excellent ejection stability although the ink set has a simple and inexpensive constitution.

While the invention has been described in detail and with reference to specific examples thereof, it will be apparent to one skilled in the art that various changes and modifications can be made therein without departing from the spirit and scope thereof.

The present application is based on Japanese Patent Application No. 2005-315772 filed on Oct. 30, 2006, and the contents thereof are being herein incorporated by reference.

The invention claimed is:

1. An ink set comprising at least three black ink compositions, including a first black ink composition having a pigment as colorant, a second black ink composition having a pigment or dye as colorant and a third black ink composition having a dye as colorant, respective concentrations of the colorants in the at least three black ink compositions being such that print formed with the at least three black ink compositions displays (a) less change in gloss than print formed wherein all of the at least three black ink compositions have pigments as colorants in the respective concentrations, and (b) less change in hue than print formed wherein all of the at least three black ink composition have dyes as colorants in the respective concentrations, the pigment of the first black ink composition being present in the highest concentration, the dye of the third black ink composition being present in the lowest concentration and the pigment or dye of the second black ink composition being present in a concentration that is between the highest concentration and the lowest concentration.

2. The ink set according to claim 1, wherein the pigment in the first black ink composition is present in a concentration of 1.5 to 10% by weight based on the total weight of the first black ink composition.

3. The ink set according to claim 1, wherein the dye in the third black ink composition is present in a concentration that is less than 0.4% by weight based on the total weight of the third black ink composition.

4. The ink set according to claim 1, wherein the pigment or dye in the second black ink composition is present in a concentration of from 0.4 to less than 1.5% by weight based on the total weight of the second black ink composition.

5. The ink set according to claim 4, which further comprises a color ink composition.

6. A recording method comprising providing the ink set according to claim 4; and ejecting liquid droplets of each of the first, second and third black ink compositions onto a recording medium.

7. Recorded matter that is recorded by the recording method according to claim 6.

* * * * *